United States Patent
Mayet

(10) Patent No.: US 7,449,078 B2
(45) Date of Patent: Nov. 11, 2008

(54) APPARATUS AND METHOD FOR MANUFACTURING A TIRE REINFORCEMENT

(75) Inventor: Jean-Claude Mayet, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 289 days.

(21) Appl. No.: 11/299,869

(22) Filed: Dec. 12, 2005

(65) Prior Publication Data
US 2006/0086452 A1    Apr. 27, 2006

Related U.S. Application Data

(62) Division of application No. 10/201,655, filed on Jul. 24, 2002, now Pat. No. 6,976,520.

(30) Foreign Application Priority Data

Jul. 26, 2001 (FR) .................................. 01 10052

(51) Int. Cl.
*B29D 30/16* (2006.01)
(52) U.S. Cl. ...................... 156/117; 156/133
(58) Field of Classification Search ................ 156/117, 156/133, 397, 173, 175, 177
See application file for complete search history.

(56) References Cited

U.S. PATENT DOCUMENTS

| | | | |
|---|---|---|---|
| 5,453,140 A | 9/1995 | Laurent et al. | |
| 5,616,209 A | 4/1997 | Laurent et al. | |
| 6,328,836 B1 | 12/2001 | Ogawa | |
| 2001/0020518 A1 | 9/2001 | Mayet | |
| 2001/0023736 A1 | 9/2001 | Mayet | |
| 2002/0117251 A1 | 8/2002 | Mayet | |
| 2002/0117265 A1 | 8/2002 | Mayet | |

FOREIGN PATENT DOCUMENTS

| | | |
|---|---|---|
| DE | 199424 | 6/1908 |
| EP | 0 580 055 A1 | 7/1993 |
| EP | 0962304 A2 | 12/1999 |

*Primary Examiner*—Geoffrey L Knable
(74) *Attorney, Agent, or Firm*—Cohen Pontani Lieberman & Pavane LLP

(57) ABSTRACT

A cord is supplied continuously and on demand by a suitable distributor. The apparatus is used with a revolving form (1) on which the reinforcement is progressively built up by depositing sections of the cord along a desired trajectory for the cord on the surface of the form. The apparatus comprises an element for depositing the cord on the surface of the form (1), describing an alternating path between two turning points, pressers close to the turning points in order to apply the cord to the form at the ends of the trajectory, acting synchronously with the depositing element, a mobile guide (5) disposed opposite the form, in the space between the form and the path described by the depositing element, a fixed guide (6) substantially parallel to the mobile guide (5), control means for moving the mobile guide (5) in a circumferential direction, and motorization means for synchronously piloting the depositing element, the pressers, and the control means of the mobile guide (5).

3 Claims, 6 Drawing Sheets

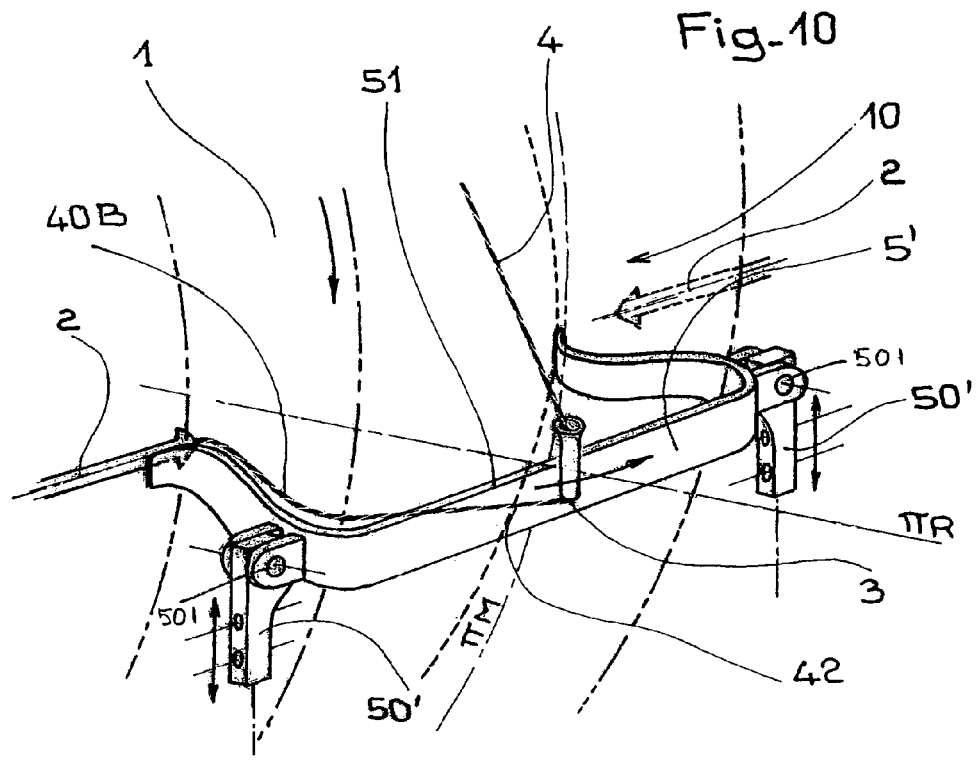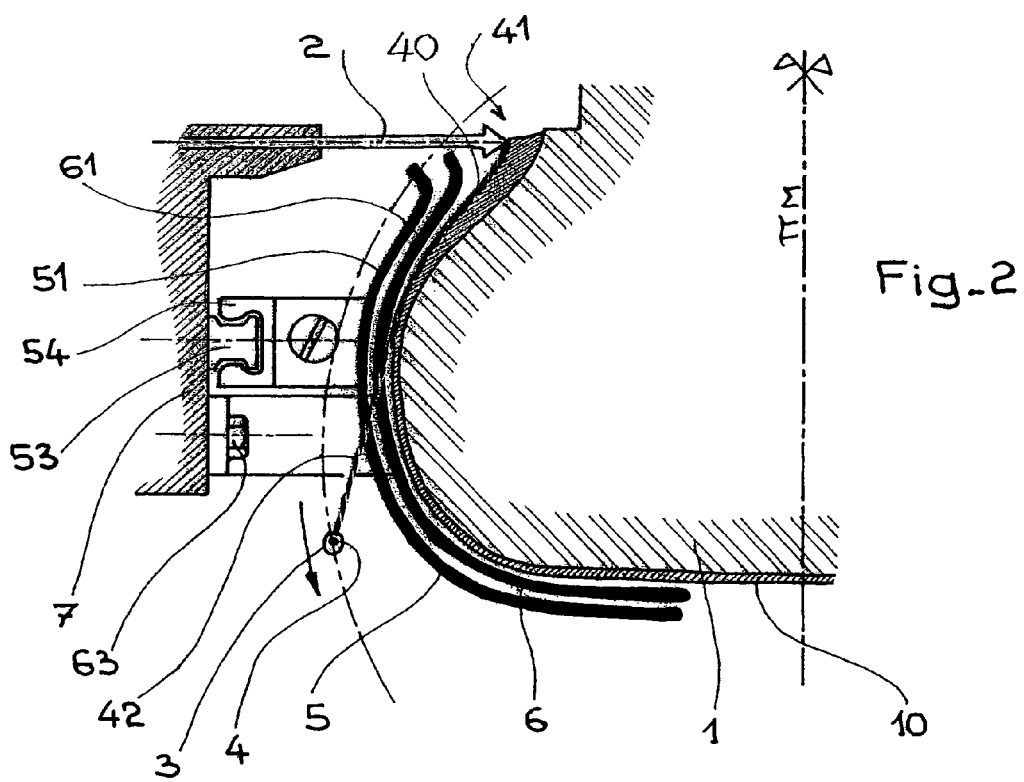

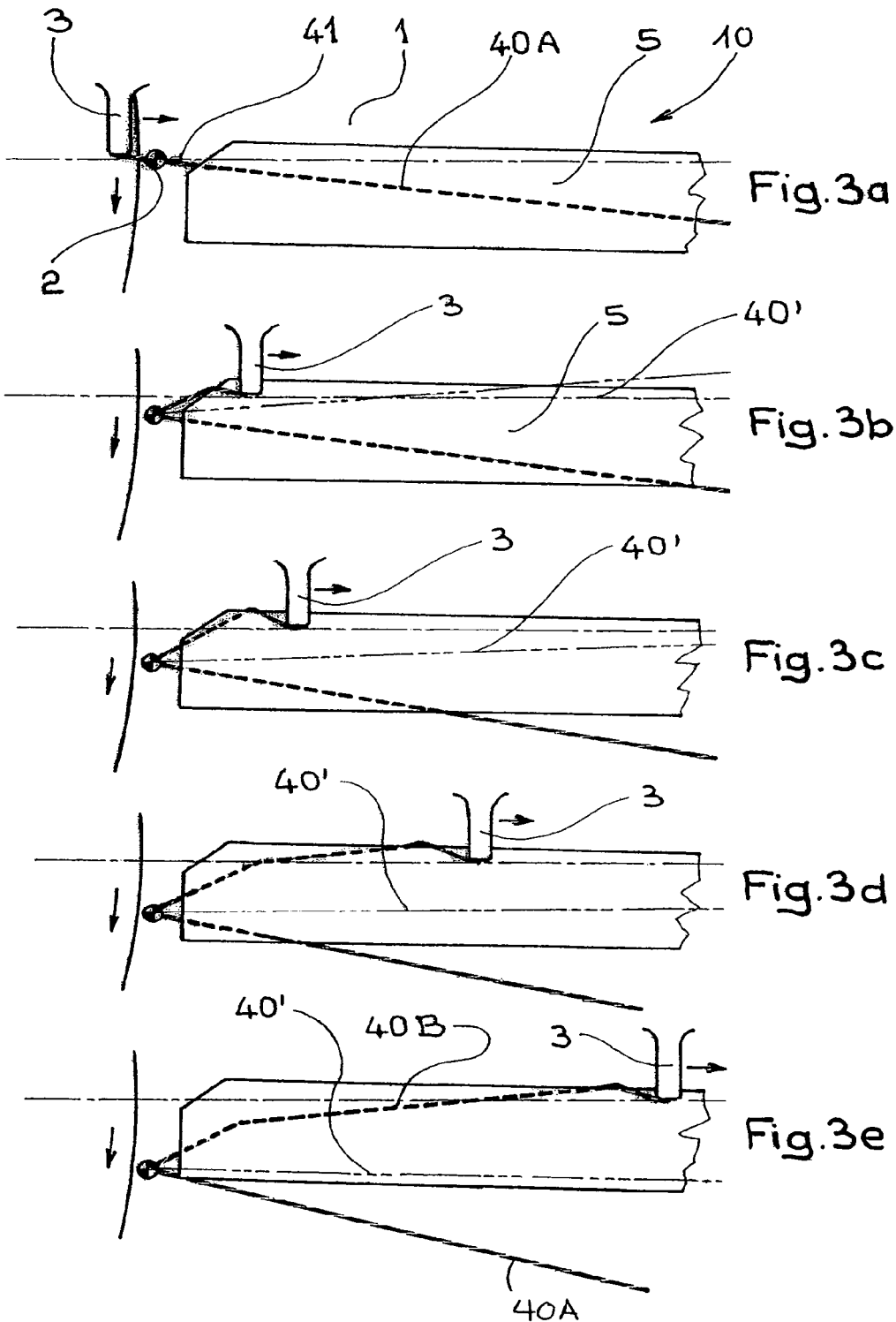

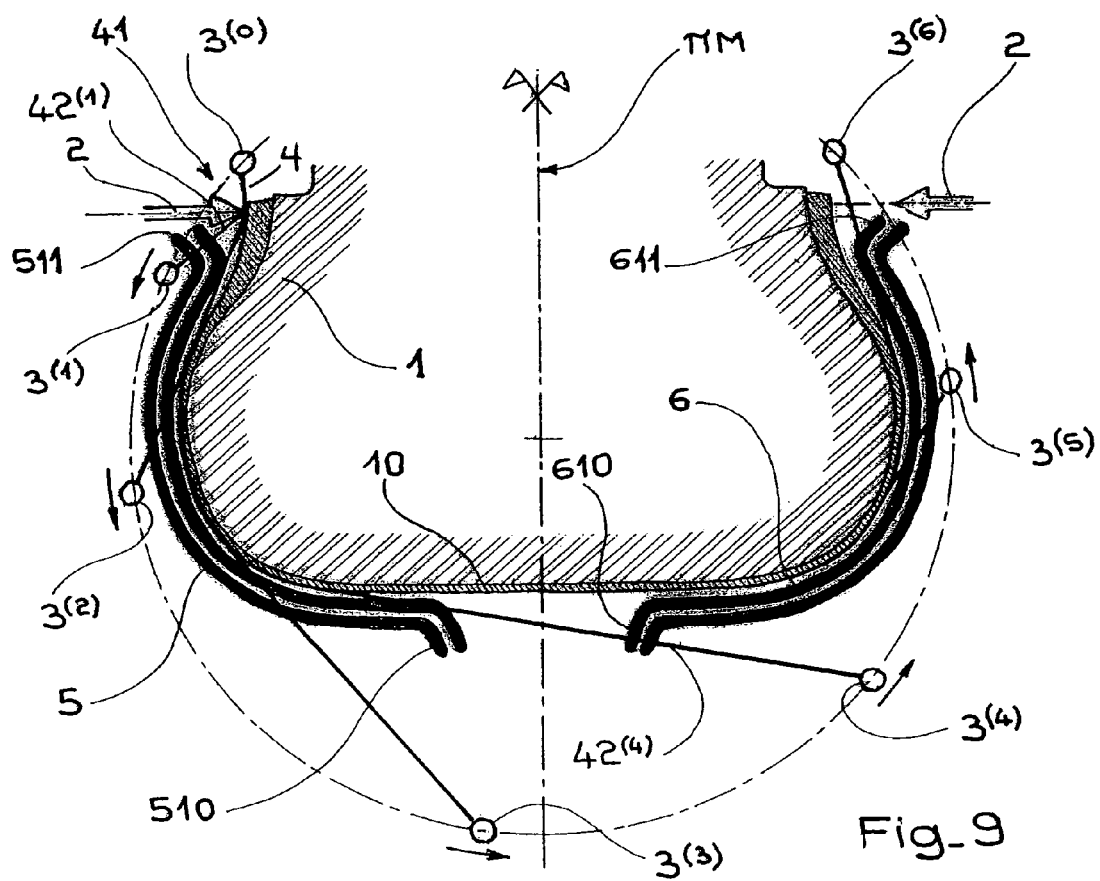
Fig_9

APPARATUS AND METHOD FOR MANUFACTURING A TIRE REINFORCEMENT

CROSS REFERENCE TO RELATED APPLICATIONS

This is a divisional of U.S. patent application Ser. No. 10/201,655 filed Jul. 24, 2002, now U.S. Pat. No. 6,976,520, which claims priority to French Application No. 01/10052 filed Jul. 26, 2001.

TECHNICAL FIELD OF THE INVENTION

The present invention relates to the manufacture of tires. More precisely, it relates to the placing of cords in order to form a tire reinforcement; and still more particularly, it proposes means and methods of manufacturing such a reinforcement on a form close to or identical to the shape of the internal cavity of the tire, i.e. a substantially toroidal form, supporting the blank of a tire during its manufacture.

THE RELATED ART

In this technical field, methods and apparatus are already known for incorporating the manufacture of tire reinforcements in the assembly of the tire itself. This means that rather than having recourse to semi-finished products, such as reinforcement plies, one or more reinforcements are realised in situ while the tire is being manufactured and starting from a single reel of cord. Among these methods and apparatus, the solution described in U.S. Pat. No. 5,453,140 is particularly adapted to forming carcass reinforcements on a rigid core, whose outer face corresponds substantially to the shape of the internal cavity of the finished tire. In U.S. Pat. No. 5,453,140, an arrangement is shown wherein the cord, intended to form a carcass reinforcement, is placed in contiguous arches over a rigid core by an actuating system comprising an eyelet fixed to a chain mounted on pulleys so as to surround the core, forming a kind of 'C'. By virtue of this actuating system, the eyelet effects a reciprocating movement about the core so as to deposit progressively and contiguously an arch with each outward, and an arch with each return, movement. With the aid of suitable pressers, the ends of the arches are applied gradually over the rigid core, which is pre-coated with raw rubber.

In order that the arches be placed as radially as possible in the sides, while imparting to the rigid core a smooth rotary movement, it is proposed that the pulleys supporting the chain be staggered around the circumference relative to a radial reference plane. However, such staggering can only ensure radial deposition for a single combination of speeds of the core and the chain, i.e. for a single number of radial arches deposited over the entire periphery of the tire. As soon as one departs from this standard configuration, adjustment of the trajectory is imperfect. It is then necessary either to put up with this or to adjust the position of the pulleys.

From U.S. Pat. No. 6,328,836, a device is known that is also provided for carcass reinforcement on a rigid core whose outer surface corresponds substantially to the shape of the internal cavity of the finished tire. The actuating system comprises an arm oscillating around an axis of rotation substantially centered on the radial section of the torus formed by the core, the cord emerging at the end thereof in order to be deposited in contiguous arches on a rigid core. In order to control the deposition trajectory of the arches in the sides, U.S. Pat. No. 6,328,836 proposes to pass the cord between two cord-guides located opposite the sides. U.S. Pat. No. 6,328,836 also proposes to impart to the core a jerky rotary motion. Taking into account the inertia of the core, this is not without practical problems, which are all the more acute since it is desired to operate at rapid deposition rates.

SUMMARY OF THE INVENTION

It is an object of the present invention to provide apparatus and methods capable of operating according to the general method described in the above-mentioned U.S. Pat. No. 5,453,140, without compromising the operation of the cord-depositing elements at high speeds, and while controlling the precision of deposition of the cord on the form. The object of the invention is to obtain good control of the trajectory of cord deposition on the form acting as a manufacturing support for a tire by suitable deviation of the cord, without having at the same time to act on the movements of the actuating system of the depositing elements and on the movements of the form.

In furtherance of this object, the invention proposes apparatus for manufacturing a tire reinforcement, the apparatus being adapted to manufacture a reinforcement formed from a cord supplied continuously and on demand by a suitable distributor, the apparatus further being adapted to be used in cooperation with a revolving form on which the reinforcement is built up progressively by the deposition of sections of cord along a desired trajectory for the cord on the surface of the form, the apparatus comprising:

- an element for depositing cord on the surface of the form, describing an alternating path between two turning points;
- a presser close to each turning point in order to apply the cord to the form at the respective ends at the desired trajectory, acting synchronously with the depositing element;
- at least one mobile guide, disposed opposite the form, in the space between the form and the path described by the depositing element;
- control means for moving the mobile guide around the circumference of the form; and
- motorization means for piloting the depositing element, the pressers and the control means of the mobile guide in synchronization.

Reference is made in particular to the above-mentioned U.S. Pat. No. 5,453,140, the disclosure of which is hereby incorporated herein by reference, as the present invention proposes a supplement to the method described therein. The present invention proposes a device capable of being used with the actuating system described therein, or with actuating systems like that of U.S. Pat. No. 6,328,836, that of United States Patent Publication No. 2001/0020518, that of United States Patent Publication No. 2001/0023736, that of U.S. patent application Ser. No. 10/066,044, or that of U.S. patent application Ser. No. 10/067,395, although such list is not limiting. (The disclosures of the foregoing patents, publications and applications are hereby incorporated herein by reference.) That is why, in a generic manner, the various figures attached to the present document show by way of a circle the outlet aperture for the cord or the eyelet in which the cord is threaded, without referring to the actuation of the aperture or eyelet, which does not per se form part of the present invention. This eyelet or outlet aperture or any equivalent element will be referred to as 'depositing element', this being set in motion by an actuating system making it describe a 'path' flying over and twisting more or less around the tire manufacturing form.

Before discussing in detail the description of these new means and method steps according to the invention, it should be recalled that, as in the above-mentioned U.S. Pat. No. 5,453,140, the term 'cord' must of course be taken in a completely general sense, including a single filament, a multiple filament, an assembly such as cable, for example, or a twine, whatever the nature of the material and whether the 'cord' is covered with rubber or not. In the present document, the term 'section' is used to designate a part of the cord that passes from one point to another in the reinforcement framework. The term 'trajectory' is used to designate the path formed by the cord after being deposited on the form. The assembly of these sections disposed all around the form will form the reinforcement proper. In a particular case, where a carcass is to be manufactured which may be radial for example, such a section may be an arch extending from one bead to the other. More generally, a section in the sense defined here may form part of any reinforcement, e.g. a crown reinforcement. These sections or arches may be separated by cutting the cord as it is deposited, or all may be connected together in the finished reinforcement, e.g. by loops.

Basically, the invention relates to the continuous deposition of a cord in a configuration as close as possible to the configuration in the finished product. The cord, being supplied on demand by a suitable distributor, comprising, for example, a reel of cord and if necessary a device for controlling the tension of the cord unwound from the reel, the manufacturing apparatus of a reinforcement formed from a single cord cooperates with a form (rigid core or membrane) on which the tire is manufactured. It does not matter whether the reinforcement is, in order to be complete, manufactured in plural successive revolutions of the form with the cord being cut or otherwise between two successive revolutions.

When positions or directions are defined with the words 'radially, axially, circumferentially', or when speaking of radii, the point of reference is the form on which the tire is made, or the tire itself. The geometric axis of reference is the axis of rotation of the form. The median plane ΠM is the plane perpendicular to the axis of rotation of the form, which can be seen for example in FIG. 2. The median plane ΠR is the plane containing the axis of rotation of the form, which can be seen for example in FIG. 5. The term 'portion' is used to designate the path of the cord between the place where it is released by the depositing element and the place where it joins the surface of the form.

BRIEF DESCRIPTION OF THE DRAWINGS

The rest of the description will explain exemplary embodiments of the invention in more detail, with the aid of the following drawings, in which:

FIG. 2 is a partial radial section of the form, with a view of the guide element according to the invention;

FIGS. 3a to 3e show partly, in a side view of the form, the use of one element of the guide element according to the invention during movement of the element for depositing cord from the zone corresponding to a bead towards the zone corresponding to the tread;

FIG. 9 is a radial section of the form, showing the use of the guide element according to the invention of both sides (axially) of the form; and FIG. 10 is a perspective view showing a modified embodiment of the guide element according to the invention.

DETAILED DESCRIPTION

Figure 1:
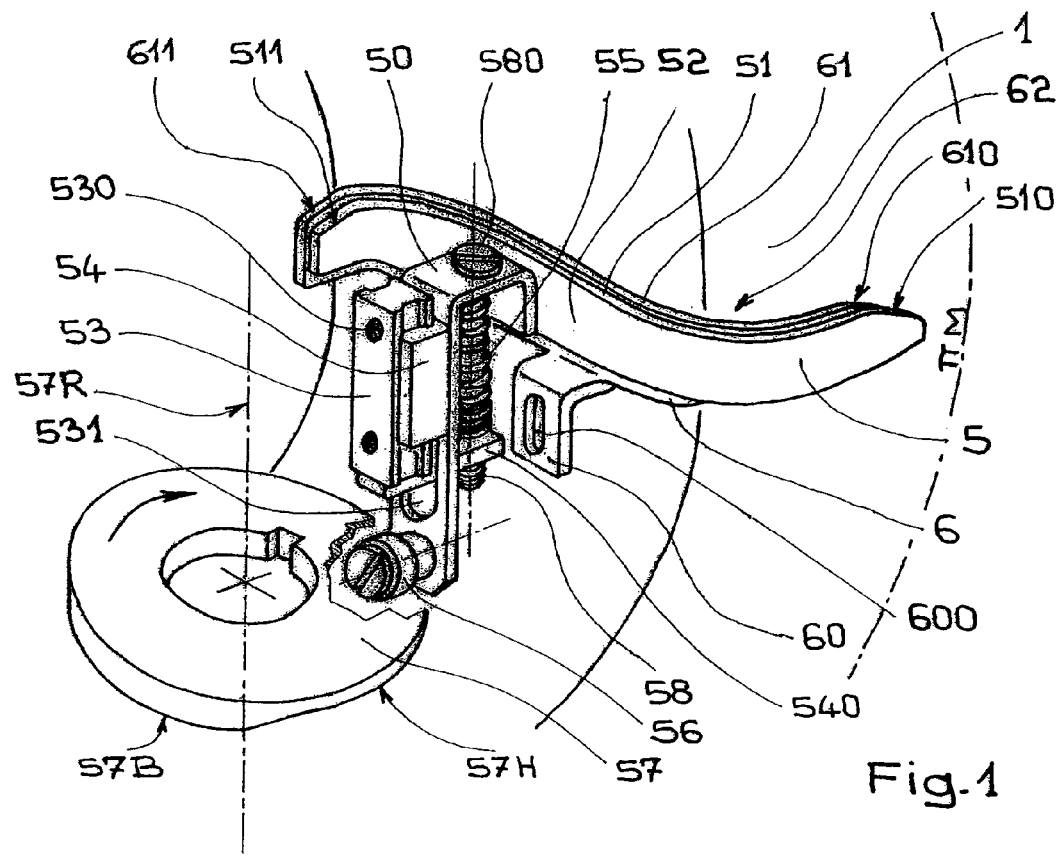
FIG. 1 is a perspective view showing the guide element according to the invention.

In FIG. 1, one can see in the background a form 1 intended to define the shape of the internal cavity of a tire. The form 1 is preferably a rigid, dismantlable core, although this is not limiting. The form is covered with rubber 10, e.g. a coating of sealing rubber with a base of butyl rubber, as well as, in general, with a coating of a rubber more adapted to cover the reinforcement cord intended to form the carcass of a tire, as can be seen in particular in FIG. 2. The rubber 10 covering the form 1 makes it possible to hold arches 40 of cord 4 over the form 1 as they are deposited, by adhesion. Obviously, the form 1 is driven in rotation by any suitable device, which is not shown.

The elements proper for depositing the cord 4 comprise in particular an actuating system (not shown) of a depositing element 3 (see FIGS. 2, 3, 4, 5, 9 and 10) for a reinforcement cord 4 and presser devices 2 (shown diagrammatically in FIGS. 2, 3a to 3e, 5, 9 and 10) on either side of the form 1.

It has already been explained that the depositing element 3 may, for example, be an eyelet or the aperture of an oscillating arm, as described above. An appropriate system for actuating the depositing element 3 is for example a chain system, as is described in U.S. Pat. No. 5,453,140, or a system with oscillating arms as is described in other cited patent applications, the two making the depositing element 3 describe a movement flying over and twisting around the form 1. The appropriate system in this case makes the depositing element 3 perform a movement in one plane, the 'plane of motion'. Care should be taken in realising the depositing element 3 in order not to damage the cord 4.

As for the pressing devices 2, these must be positioned in a suitable manner in order to perform the function described in the above-mentioned U.S. Pat. No. 5,453,140. It should be noted that they may both comprise a fork and a hammer which can move between a retracted position (remote from the form 1) and an extended position (in contact with the form 1). With these pressing devices, it is possible to form a loop of cord 4, and to deposit the loop against the form 1.

FIG. 1 will be referred to in order to introduce the description of the guide element according to the invention. For greater clarity, in FIG. 1 neither the element for depositing the cord on the form nor the pressers intended to act in the zones corresponding to the potential bead of the tire is shown. The guide element comprises a mobile guide 5. The guide element also has an advantageous option, which is that it includes a fixed guide 6. It should be emphasized that it is not imperative, but only advantageous, to use a fixed guide 6. This will be discussed further below.

The mobile guide 5 is rigidly connected to a catch hook 50 having a U shape, whose branches are of unequal lengths. The longer branch of the catch hook 50 is rigidly connected to a mobile carriage 54. The mobile carriage 54 is mounted on a fixed rail 53. The fixed rail 53 comprises two bores 530.

Figure 6:
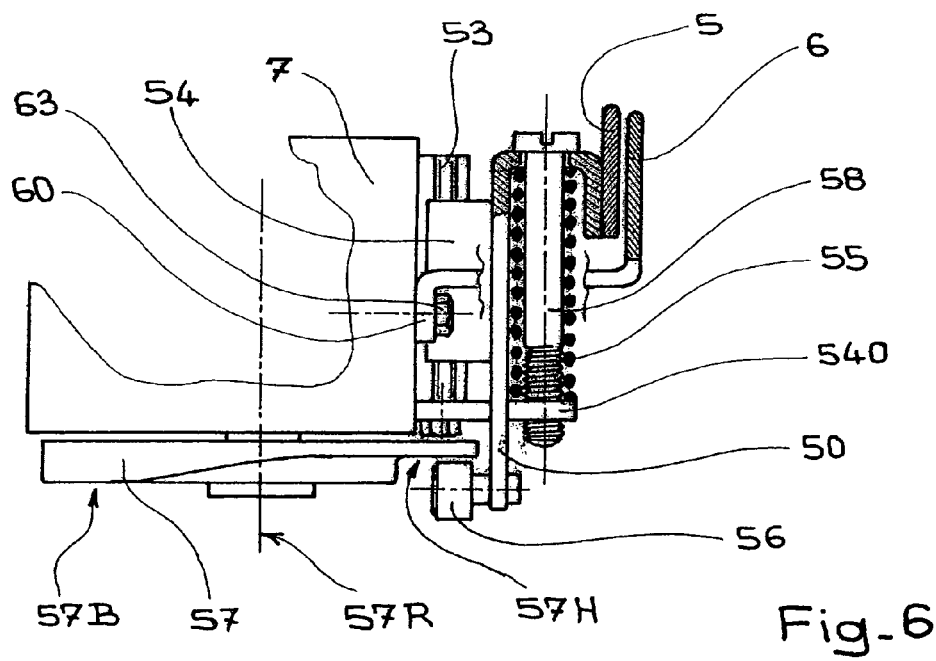
FIG. 6 shows a detail of the control of the guide element according to the invention.

With reference to FIG. 2 or 6, it can be seen that the fixed rail 53 is mounted on a frame 7 by two screws (not shown) passing through the bores 530. The mobile carriage 54 slides on the fixed rail 53. A support 540 is mounted at one end of the fixed rail 53 and projects through a slot 531 formed in the longer of the two branches of the mounting hook 50. This support 540 has a threaded bore in which is mounted an adjusting screw 58 having a head 580. The head 580 of the adjusting screw 58, extending from the mounting hook of the mobile guide 5, forms a stop limiting the movement of the mobile carriage 54, and therefore of the mobile guide 5. A restoring spring 55 is inserted between the support 540 and the catch hook 50. This spring permanently tends towards biasing back (upwards in FIG. 1) the mobile guide 5. The restoring spring 55 therefore tends towards biasing the catch hook 50 against the head 580 of the adjusting screw 58.

At the end of the catch hook 50, a freely rotating roller 56 is mounted, which is intended to cooperate with a cam 57 mounted on a shaft. The axis of rotation 57R of the cam 57 is shown in FIG. 1 and FIG. 6. The axis of rotation 57R is obviously set in motion by a movement synchronized with the actuating system of the depositing element 3. The cam 57 comprises a high track 57H and a low track 57B. When the roller 56 rolls on the low track 57B, the catch hook 50 is pushed back downwards, compressing the restoring spring 55. The mobile guide 5 adopts a low position and is retracted behind the fixed guide 6. When the roller 56 is opposite the high track 57H, the catch hook 50 is pushed back up under the action of the restoring spring 55. This stroke is limited by the position of the adjusting screw 58, so that at that moment the roller 56 does not compulsorily roll on the high track 57H. There may be some play between the roller 56 and the high track 57H. The positioning of the mobile guide 5 is imposed by the adjusting screw 58. This cam and roller system intended to follow the profile of the cam is only one of many ways of controlling the movement of the mobile guide 5. It would also be conceivable to use many other controls, mechanical or electrical.

It can be seen that the fixed guide 6 comprises a catch hook 60, having a slot 600. FIG. 6 shows that the catch hook 60 is mounted on the frame 7 by means of a screw 63 passing through the slot 600 shown in FIG. 1. The slot 600 is elongate in order to permit adjustment of the position of the fixed guide 6.

The application illustrating the invention aims to manufacture a radial carcass. It is therefore a question of anchoring arches in each bead of the future tire, and to effect deposition which is as precise as possible in the sides of the future tire. The mobile guide 5 essentially has a curved blade 52 to mate with the contour of the side of the form 1 (in this case, the form 1 is a rigid core of aluminium, which is segmented in order to be dismantled and removed from a tire after vulcanisation thereof). The curved blade 52 of the mobile guide comprises an edge 51 intended to come into guiding contact with the cord. The mobile guide 5 is interposed between the path of the depositing element 3 and the form 1. The mobile guide 5 is installed opposite one of the turning points of the depositing element 3 and at least part of the path of the depositing element 3.

The same applies to the fixed guide 6. The fixed guide 6 essentially comprises a curved blade 62 parallel to the curved blade 52. The curved blade 62 of the fixed guide comprises an edge 61 intended to come into guiding contact with the cord. The fixed guide 6 is interposed between the path of the depositing element 3 and the form 1. The fixed guide 6 is installed opposite one of the turning points of the depositing element 3 and at least part of the path of the depositing element 3.

In fact, the mobile and fixed guides are both disposed between the path of the depositing element 3 and the trajectory of the cord 4 at the surface of the form 1 after deposition.

The drawings show that the fixed guide 6 is closer to the form 1 than the mobile guide 5. This is an arbitrary choice of construction. It would be just as conceivable to reverse the relative positions of the mobile 5 and the fixed 6 guide relative to the form 1. In a purely illustrative manner, it should be noted, for example, that the fixed guide is about 2 to 5 mm from the free surface of the form 1 on which the cord 4 is deposited for a configuration permitting the manufacture of tires for coaches, and that it would be about 5 to 10 mm from the free surface of the form 1 on which the cord 4 is deposited for a configuration permitting the manufacture of tires for heavy goods vehicles, and that at least 1 mm clearance is provided between the mobile and the fixed guides.

FIGS. 1, 2, 3*a* to 3*e*, 4, 5, and 9 show mobile and fixed guides associated with a half-form, guiding the cord into one side between the bead and the lateral end of the zone of the tread. The contact edge 51 of the mobile guide comprises a segment which is inscribed in one plane (this aspect is a particular, non-limiting case) and, on the side close to the shoulder of the tire, an end 510 which moves progressively away from this plane. In the same way, the contact edge 61 of the fixed guide comprises a segment which is inscribed in one plane and, on the side close to the shoulder of the tire, an end 610 which moves progressively away from this plane.

Furthermore, the contact edge 51 of the mobile guide comprises a segment which is inscribed in one plane and, on the side close to the bead of the tire, an end 511 which moves progressively away from this plane. In the same way, the contact edge 61 of the fixed guide comprises a segment which is inscribed in one plane and, on the side close to the bead of the tire, an end 611 which moves progressively away from this plane.

The modus operandi of the invention is described below.

In FIGS. 3*a* to 3*e*, the mobile guide 5 is shown with, in the background, a form 1, driven in rotation in the direction indicated by a downward-pointing arrow, to the left of each of the Figures. In FIG. 3*a*, the depositing element 3 can be seen, having arrived at the turning point. A pressing device 2 flattens the cord against the form, just downstream of the depositing element 3. A portion 40A of the cord can be seen, which the action of the pressing device 2 has at least partly adhered to the coating of rubber 10 with which the form 1 is covered. After the action of the pressing device 2, the depositing element 3 describes a movement in the direction of the horizontal arrow adjacent to the depositing element 3 in FIG. 3*a*. From the series of FIGS. 3*a* to 3*e*, it can be seen that the mobile guide 5 removes the cord from the position that it would naturally take between the pressing device 2 and the depositing element 3 if there were no mobile guide. By virtue of this, on either side of the loop formed by the cord in the zone 41 of the bead, the adjacent sections of cord are sufficiently separated from one another. FIG. 3*e* shows a cord portion 40B well removed from the cord portion 40A before being adhered to the form 1.

Figure 5:
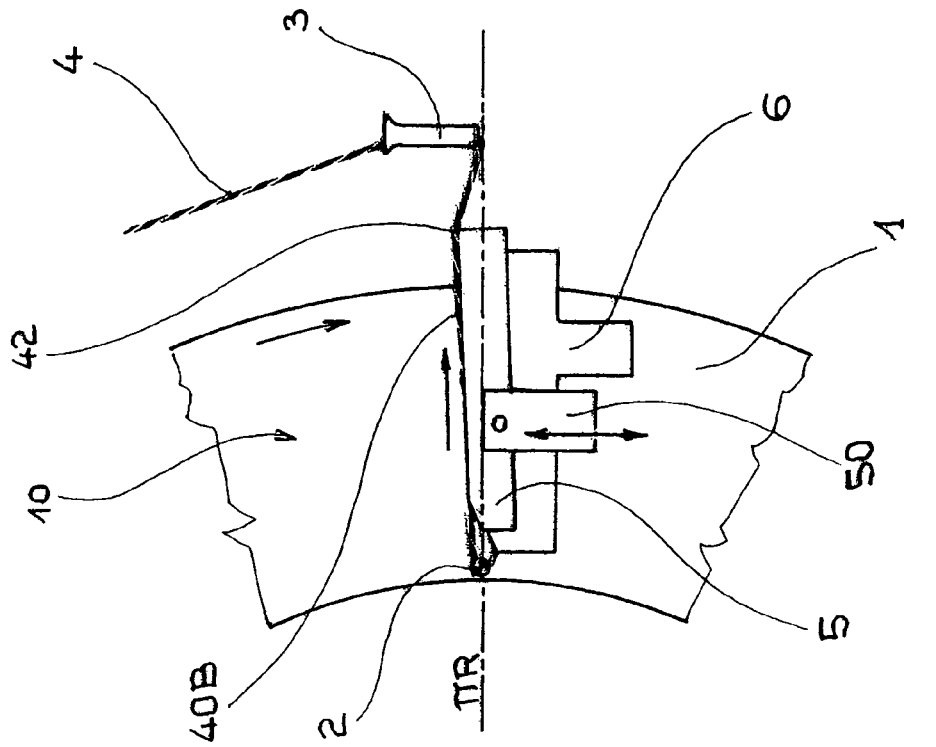
FIG. 5 is a side view of the form, showing the configuration of the guide element according to the invention during the return movement of the cord depositing element towards the zone corresponding to the tread.
Figure 4:
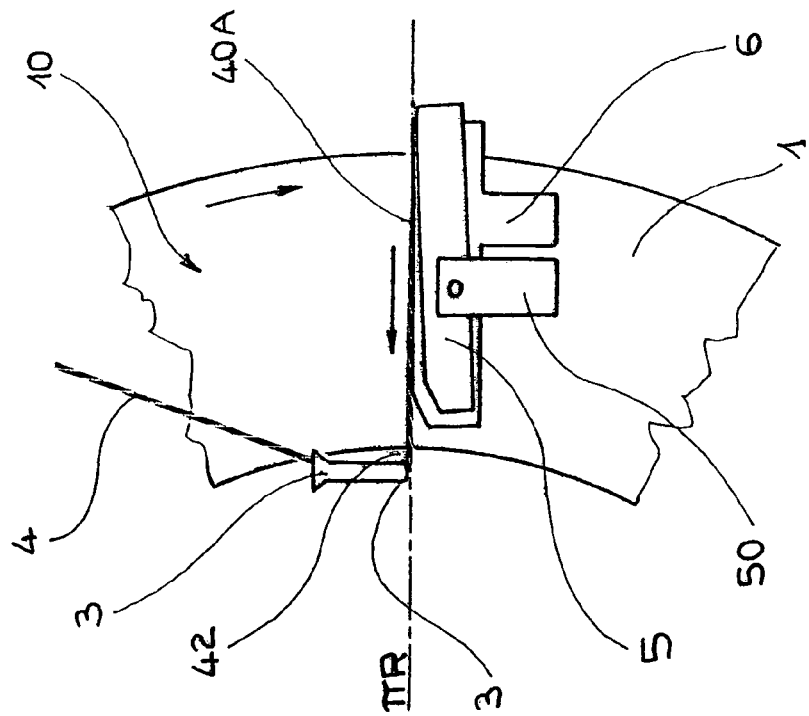
FIG. 4 is a side view of the form, showing the configuration of the guide element according to the invention during the forward feed of the cord-depositing element towards the zone corresponding to the bead.

FIGS. 4 and 5 show more generally the deposition of cord on the form 1. In FIG. 4, it can be seen that the form 1 is set in rotation in the direction shown by the arrow. One can see the position of the mobile guide 5 and the fixed guide 6. The depositing element 3 can also be seen, downstream of which a portion 40A of the cord 4 can be seen. Upstream of the depositing element 3, the cord 4 joins a cord distributor (not shown). The portion 40A is in contact with the fixed guide 6.

It is desirable that the arches of the radial carcass of a tire are disposed in a radial plane. This radial plane will be called the plane ΠR of reference. The actuating system of the depositing element 3 makes the latter describe a path within one plane. During this motion, the form 1 is rotating in the direction indicated. The contact edge 61 of the fixed guide 6 is therefore inclined relative to the plane ΠR of reference so that, taking into account the rotation of the form 1 during motion of the depositing element 3 and taking into account the fact that the point at which there is contact between the cord 4 and the fixed guide 6 moves along the edge 61, the portion 40A of the cord 4 is finally deposited radially on the form 1 (or more generally along the desired trajectory).

In FIG. 4, the depositing element 3 is at the end of the reciprocating movement which it describes around the form 1. It is known that this is the moment when a presser will come into action (not shown in FIG. 4), allowing a loop to be formed and to be applied against the form 1.

In FIG. 5, it can be seen that the cord 4 has been anchored against the form 1 by means of the presser 2 in a zone corresponding to the bead of the future tire. The movement of the depositing element 3 in the direction of the radial (double headed) arrow leads to the laying of the cord 4, a portion 42 of which can be seen extending between the depositing element 3 and the form 1. While the movement of the depositing element 3 is being carried out, the cord 4 rubs along the length of the edge 51 of the mobile guide 5. It can be seen that the mobile guide 5 has been moved circumferentially in the direction opposite to that of rotation of the form 1, in order to constrain the portion 40B to form the desired removal with the portion 40A, which has been stuck to the form 1 in the previous phase of movement of the depositing element 3. The contact edge 51 of the mobile guide 5 is inclined relative to the plane ΠR of reference, so that, taking into account the continuous rotation of the form 1, at a constant speed, during the movement of the depositing element 3, the portion 40B of the cord 4 is deposited on the form 1 radially (or more generally along the desired trajectory).

It thus becomes obvious that, without having to impose a jerky indexing movement on the form 1, the final deposition trajectory of the cord 4 on the form 1 can be correctly controlled, along with the rate of deposition. Obviously, the exact position of the mobile guide 5 may vary at any moment, in this case according to the shape of the cam 57.

Figure 7:
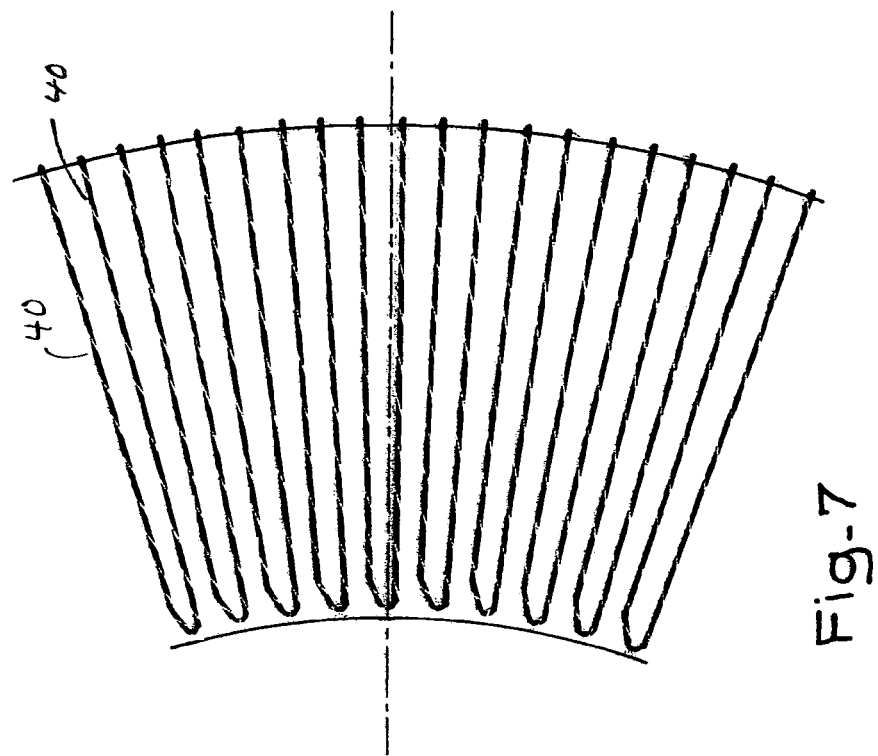
FIG. 7 shows diagrammatically the result obtained by the invention.
Figure 8:
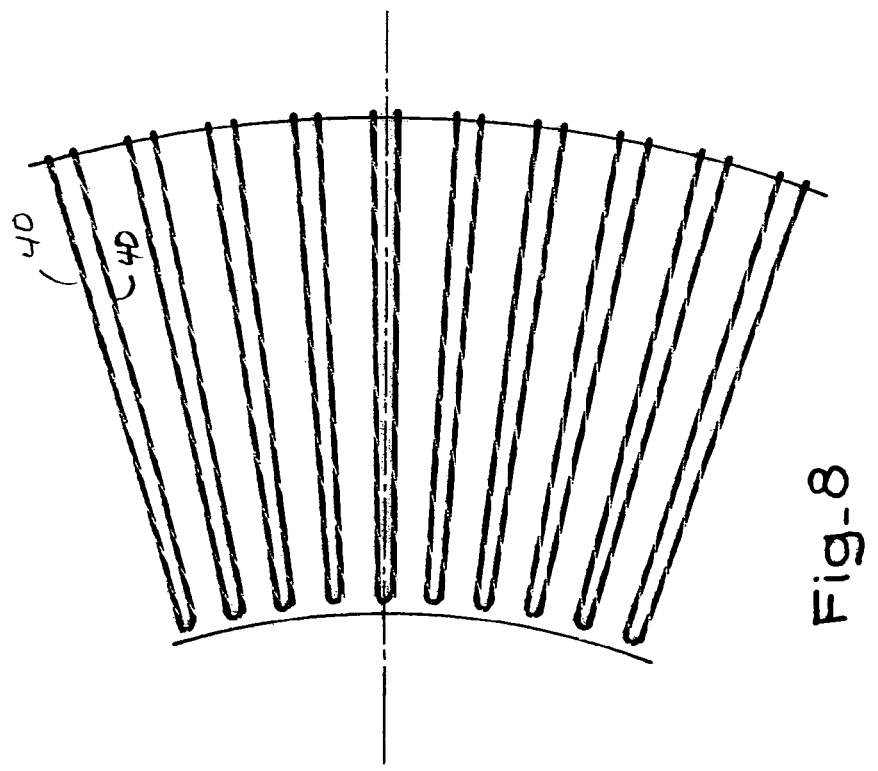
FIG. 8 shows diagrammatically the result obtained with the same means of depositing cord, but without the use of the guide element according to the invention.

FIG. 8 illustrates the contour of the various arches of cord 4 deposited on the form with a specified actuating system of the depositing element, but without the use of the guide element according to the invention. FIG. 7 shows the result obtained with the same actuating system of the depositing element and with the action of a fixed guide 6 and a mobile guide 5 according to the invention. FIG. 7 shows that the spacing between the different to-and-fro motions of the cord, i.e. the spacing between adjacent arches, is regular and constant, whereas in FIG. 8, the different arches of the cord 4 remain grouped in twos.

Thus, if a fixed guide is used, it is disposed close to the mobile guide, and this fixed guide is positioned and oriented so that the final trajectory of the cord 4 deposited when the portion cooperates with the edge of the fixed guide corresponds to that intended on the form. By the combined use of a correctly adjusted fixed guide and a mobile guide moved along a predetermined path and itself correctly positioned and oriented, it is possible to act on the final trajectory occupied by the cord on the form so as to obtain very precise deposition and a large degree of control of the rate of deposition and of the spacing between the carcass cords.

With reference to FIG. 9, an advantage of the shape given to the ends 510, 610, 511 and 611 will be explained. This Figure should be examined while first considering the position $3^{(0)}$ of the depositing element 3 at the left-hand bead in FIG. 9. This is the turning point of the depositing element 3. As the cord 4 has been anchored against the form 1 by means of the presser 2 in the zone 41 corresponding to the bead of the future tire, the movement of the depositing element 3 in the direction of the arrow shown just next to the depositing element 3 brings about the laying of the cord 4, of which a portion $42^{(1)}$ can be seen extending between the position $3^{(1)}$ of the depositing element 3 and the form 1. At this moment, the cord 4 comes into contact with the end 511 of the edge 51 of the mobile guide 5. It can be seen that it is presented to the mobile guide 5 substantially perpendicularly. The movement of the depositing element 3 brings it to the positions $3^{(2)}$, $3^{(3)}$, the cord 4 rubbing along the edge 51 of the mobile guide 5. When it reaches position $3^{(4)}$, a portion $42^{(4)}$ extending between the position $3^{(4)}$ of the depositing element 3 and the form 1 comes into contact with the end 610 of the edge 61 of the fixed guide 6. It can be seen that the cord is presented to the fixed guide 6 substantially perpendicularly. The movement of the depositing element 3 brings it to positions $3^{(5)}$ and then $3^{(6)}$, the cord 4 rubbing along the edge 61 of the fixed guide 6. On the return, the roles of the mobile and fixed guides are reversed for deposition of the cord in each of the two sides. The movement of the depositing element 3 in the direction opposite to that of the arrows shown in FIG. 9 also brings about the laying of the cord 4, which this time rubs first along the edge 51 of the mobile guide to the right in FIG. 9, then along the fixed left-hand guide 6, the shape of the cam 57 being such that the left-hand mobile guide 5 is retracted from the adjacent fixed guide 6.

The choice of one or the other of the contacts of the cord on the mobile guide or on the fixed guide depends on the action that one wants to have on the trajectory along which the cord 4 will be deposited and adhered to the form 1.

Whereas hitherto, mobile and fixed guides each associated with a half-form have been described, FIG. 10 shows a modification in which a mobile guide 5' passes from one bead to the other. Not only does it act as the mobile guide 5 described above, but it also acts as the fixed guide described above by continuing to guide the cord 4 also in cooperation with the movement of the depositing element 3 when it passes from the shoulder to the bead opposite one side. The mobile guide 5' is mounted by shafts 501 on hooks 50' opposite each of the sides of the form 1. The hooks 50' are driven by a suitable movement in order to displace the mobile guide 5' circumferentially relative to the form 1, in order to adapt the trajectory of deposition of the cord 4 to the form 1.

Various further modifications are possible without going beyond the scope of the invention. For example, as is already indicated in the above-mentioned U.S. Pat. No. 5,453,140, a carcass reinforcement can be realised in which the rate of deposition of the cord is variable. 'Rate of deposition' is taken to mean the distance resulting from the sum of the spacing between two adjacent cords and the diameter of the cord. It is well-known that for a carcass reinforcement, the spacing between cords varies according to the radius to which it is measured. This modification is not applied here, but rather a rate that is variable at a specified radius. It suffices to this end, without changing the rate of operation of the cord-depositing elements (actuating system and pressers), to vary according to any suitable formula the speed of rotation of the form and to control the mobile guide in a suitable manner. For example, it is possible to control the position of the stop 580 (FIGS. 1 and 2) by a stepper motor. Thus a tire is obtained whose carcass cords, e.g. for a radial carcass, are disposed at a rate having a controlled variation for a specified radial position.

The invention also extends to a method of manufacturing a tire reinforcement from a cord supplied continuously and on demand by a suitable cord distributor, using a revolving form having an axis of rotation and on which the reinforcement is progressively built up, comprising a stage for depositing on the form a layer of raw rubber at least in the zones where the ends of the reinforcement are anchored, and in which the form is driven in rotation at a speed that is always non-zero, and wherein since the cord is held on the form in an anchoring zone synchronously with rotation of the form, a depositing element in which the cord is threaded is made to describe a reciprocating motion about the form in order to deposit progressively a cord section during the outward movement of the depositing element and a cord section during the return motion, the ends of each section being temporarily pressed against the form in the anchoring zones, and while the depositing element performs its alternating movement, a mobile guide is so acted on as to move in a circumferential direction a portion of the cord disposed between the depositing element and the form, in order to adapt the final trajectory made by the sections once deposited on the form, and the aforementioned movements are repeated until the desired number of cord sections are deposited on the surface of the form, along the desired trajectory for the cord on the surface of the form.

Preferably, by means of a suitable presser, a loop is formed with the cord and the loop is flattened against the form at each end of the final trajectory. Preferably, also, the speed of rotation of the form is constant, and a portion of the cord located between the depositing element and the form is moved in a circumferential direction in order to obtain a final trajectory of the sections, once deposited on a toroidal form, forming a constant angle relative to the median plane.

What is claimed is:

1. A method of manufacturing a tire reinforcement from a cord supplied continuously and on demand by a cord distributor, using a revolving form having an axis of rotation and on which the tire reinforcement is progressively built up, the method comprising:
    depositing on the revolving form a layer of raw rubber at least in zones where ends of the tire reinforcement are anchored, wherein
    the revolving form is driven in rotation continuously,
    the cord is held on the revolving form in an anchoring zone,
    a depositing element in which the cord is threaded is made to describe a reciprocating motion about the revolving form and to synchronize with the rotation of the revolving form in order to deposit progressively a first cord section during an outward movement of the depositing element and a second cord section during a return motion,
    the ends of each the first and second cord sections are temporarily pressed against the revolving form in the anchoring zones, and
    while the depositing element performs its reciprocating motion, a mobile guide is so acted on as to move, in a circumferential direction, a portion of the first and second cord sections disposed between the depositing element and the revolving form, in order to form part of a final trajectory made by cord sections deposited on the revolving form, and
    repeating the aforesaid movements to deposit additional cord sections on the revolving form, along the final trajectory for the cord sections on the revolving form.

2. The method according to claim 1, wherein by means of a presser, a loop is formed with the cord and the loop is flattened against the revolving form at each end of the final trajectory of the cord sections.

3. The method according to claim 1, wherein the revolving form is substantially toroidal and the speed of rotation of the revolving form is constant, and wherein the cord sections, once deposited on the form, form a constant angle relative to a median plane.

* * * * *